March 4, 1924.
C. G. PFEIFFER
LOADING MACHINERY
Filed May 22, 1922     3 Sheets-Sheet 2
1,485,812
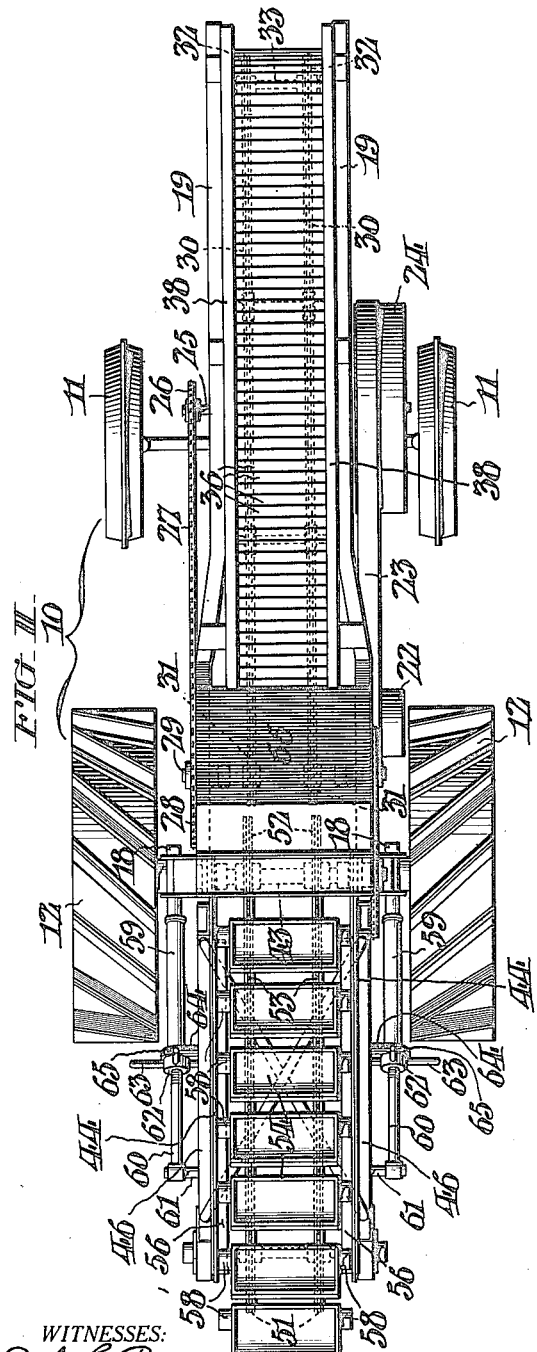
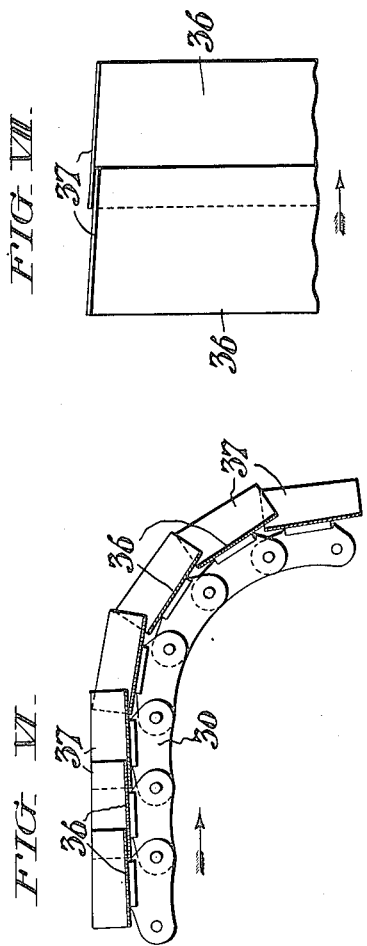
INVENTOR:
Charles G. Pfeiffer,
BY
ATTORNEYS.
WITNESSES:

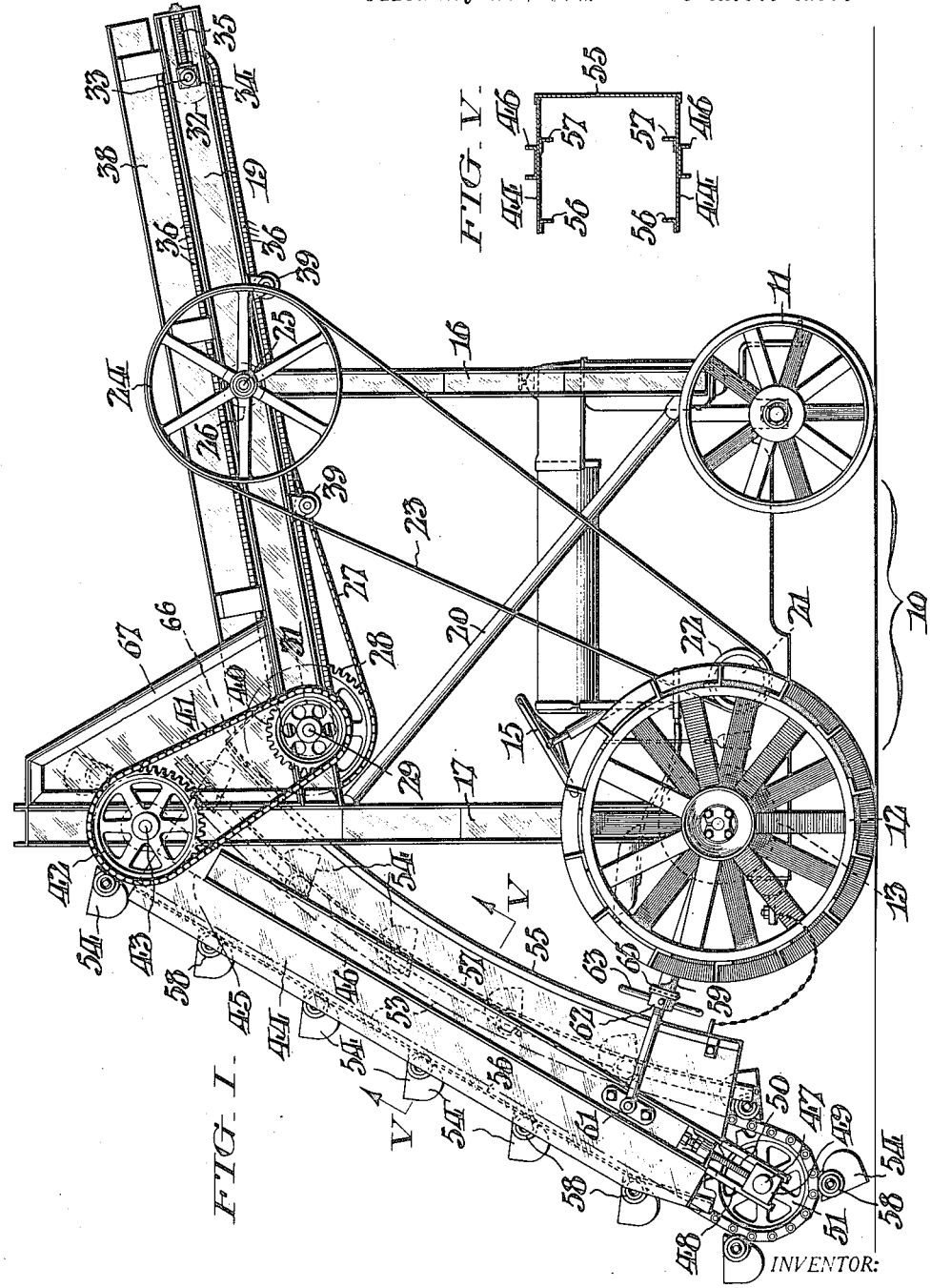

March 4, 1924.
C. G. PFEIFFER
1,485,812
LOADING MACHINERY
Filed May 22, 1922   3 Sheets-Sheet 3
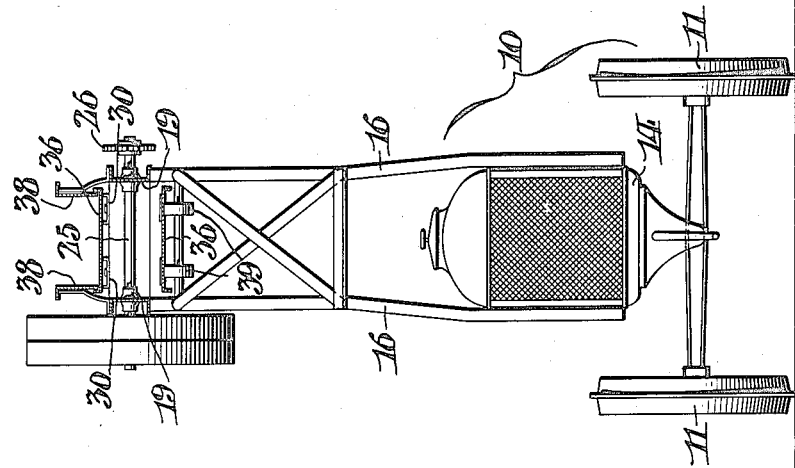
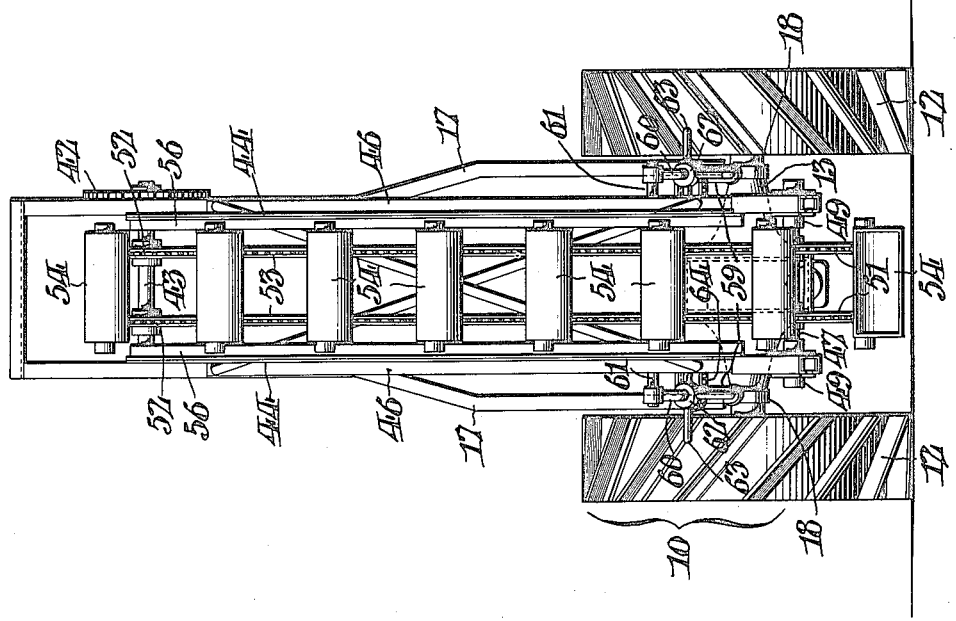

Patented Mar. 4, 1924.

1,485,812

UNITED STATES PATENT OFFICE.

CHARLES G. PFEIFFER, OF PHILADELPHIA, PENNSYLVANIA, ASSIGNOR TO SPECIALTY ENGINEERING COMPANY, OF PHILADELPHIA, PENNSYLVANIA, A CORPORATION OF PENNSYLVANIA.

LOADING MACHINERY.

Application filed May 22, 1922. Serial No. 562,604.

*To all whom it may concern:*

Be it known that I, CHARLES G. PFEIFFER, a citizen of the United States, residing at Philadelphia, county of Philadelphia, and State of Pennsylvania, have invented certain new and useful Improvements in Loading Machinery, whereof the following is a specification, reference being had to the accompanying drawings.

This invention relates to loading machinery and its principal object is to provide a compact assembly of elevator and conveyor elements designed to be mounted upon the frame of a tractor so that the machine may be readily transported to the location of the material to be handled and the loading machinery subsequently driven by the prime mover of the tractor.

In addition to the foregoing, this invention comprehends improvements in the details of construction and arrangement of correlated parts of a loading machine, to be hereinafter described and particularly pointed out in the appended claims.

In the accompanying drawings, Fig. I is a view in side elevation of a loading machine constructed in accordance with my invention, and illustrating the same in superimposed position upon a tractor.

Fig. II is a view of the loading machine in top plan.

Fig. III is a view thereof in rear elevation.

Fig. IV is a view in front elevation of the machine, omitting some of the parts and illustrating the horizontal conveyor in transverse section.

Fig. V is a detail view in transverse section taken on the line V—V of Fig. I.

Fig. VI is a detail view in longitudinal section of a fragment of the horizontal conveyor; and Fig. VII is a fragmentary view in plan of a pair of articulated elements forming part of the conveyor, to illustrate their relation.

With reference to the drawings, 10 indicates generally a gasoline tractor of a light, popular, commercial type, only sufficient details being shown to illustrate the relation of the parts thereof with respect to the correlated parts of my improved loading machine, such details including the forward steering wheels 11, rear driving wheels 12, the axle housing 13 for the latter, the transverse frame member 14 surmounting the front wheels and the steering wheel 15, to the rear of which the driver is located.

My improved loading machine comprises in its essentials a pair of front supporting struts 16 and a pair of rear supporting struts 17, both consisting preferably of standard channel members. The rear struts 17 are supplied at their lower ends with castings 18 designed to encircle the ends of the axle housing 13, and the forward struts 17 are intended to rest upon the transverse frame member 14. Mounted upon the upper ends of the forward struts 16 is a pair of inclined beams 19 forming part of the horizontal conveyor, the rear ends of said beams being secured in any convenient manner to the rear struts 17 at points below the upper ends of the latter, the structure co-operating with the frame of the tractor to form a closed, substantially rectangular frame, insuring rigidity for the support of the remaining elements to be described. The structure is further braced by the provision of inclined tension members 20 connected at their lower ends to the lower ends of the forward struts 16 and at their upper ends to the struts 17. A power shaft, forming part of the prime mover of the tractor extends transversely of the machine and beyond the side thereof as indicated at 21 to support a pulley 22 which is connected by means of a flexible power transmission element 23 to a relatively large fast and loose pulley couple 24 carried upon the protruding end of a transverse shaft 25 journalled upon and between the aforesaid beams 19 at points located directly above the struts 16. The opposite end of the shaft 25 is provided with a sprocket wheel 26 which is connected by means of a flexible power transmission element 27 to a sprocket wheel or the like 28 for the purpose of driving the latter through the instrumentality of the power transmitting mechanism described. The wheel 28 is mounted upon a transverse shaft 29, in turn suitably journalled upon and between the aforesaid beams 19 for the purpose of actuating the horizontal conveyor which consists of a pair of endless chains 30 which are trained over sprocket wheels 31 carried by the shaft 29, and sprocket wheels 32 mounted upon a transversely extending shaft 33 located at the upper end of the beams 19 and journalled in blocks 34 which are slidably mounted in longitudinal recesses of said beams and adapted to be adjusted by means of threaded rods 35 to tension the chains 30. Opposed links of the chains 30 are designed to support trough shaped elements 36 arranged in nested relation as shown in Figs. VI and VII to define along the upper stretch a trough-like conveyor surface. The elements 36 include lateral flanges 37 which are designed to overlap the lower edges and outer surfaces of a pair of guard aprons 38 located above the conveyor so as to coact with the upper stretch of the latter to form a chute along which the material is conveyed. The lower stretch of the conveyor may travel over supporting rollers 39 carried by the beams 19. A sprocket wheel 40 is mounted on one end of the shaft 29 and is operatively connected by means of a chain 41 to a sprocket wheel 42 mounted upon one end of a transverse shaft 43 suitably journalled between and upon the rear struts 17. The shaft 43 also affords a swinging support for an elevator comprising a pair of spaced, side plates 44, each having a hanger 45 affixed to its upper end whereby the shaft 43 may extend through said hangers. A channel beam 46 is riveted or otherwise secured to the outer surface of each side plate 44 to reinforce the same and afford a support for a transverse shaft 47 which is mounted through the medium of a pair of slotted castings 48, each casting being bolted to its respective channel beam 46. The ends of the shaft 47 are journalled in blocks 49 which are shiftable within the slotted castings by virtue of threaded rods 50 cooperating therewith in the manner shown and having anchorage upon said castings. A pair of sprocket wheels 51 are fixed to the shaft 47 and a similar pair of sprocket wheels 52 are fixed to the shaft 43, whereby bucket chains 53 may be trained over the sprockets 51 and 52 to support a series of buckets 54. The lower edges of the side plates 44 are bridged by means of a plate 55, curved so as to afford ample head space for the operator of the machine, and to form, in conjunction with the side plates an enclosed runway for the return stretch of the bucket chain. A pair of angle irons 56 and 57 are fixed to the inner surface of each side plate 44 to form tracks upon which to support the buckets along the loaded and return stretches respectively of the bucket chain through the medium of rollers 58 carried by each bucket and adapted to ride upon the tracks. The tracks 57 are preferably curved to follow the plate 55. The lower end of the elevator may be moved vertically for the purpose of elevating it above the surface of the ground while transporting the machine. This is effected by means of a structure comprising a pair of tubular members 59, each having one end pivotally connected to an associated member 18 of the pair encircling the axle housing, and each receiving in telescopic relation a threaded rod 60. The protruding ends of the latter are pivotally connected to the beams 46 of the elevator through the medium of castings 61 bolted thereto. An internally threaded adjusting member 62 cooperates with each rod in threaded engagement to rest upon the ends of the tubular members and by rotation to raise or lower the elevator end, such rotation being facilitated by means of radial arms 63 forming parts of the members 62. The latter are connected together for rotation in unison by means of an endless chain 64 which is trained over sprocket wheels 65, one being formed with each of the aforesaid members 62. The upper end of the elevator is designed to overhang the receiving end of the conveyor, so as to discharge material thereupon. The material while thus transferred is preferably conducted over an apron 66 having a flange which laps around the upper edge of the bridging sheet 55 and slopes downwardly to the surface of the conveyor. To prevent flying dust I prefer to enclose the discharging and receiving ends respectively of the elevator and conveyor by means of a sheet metal shed which is built around an angular frame 67 mounted upon the mutually adjacent portions of the frame members 17 and 19 as shown.

During transportation of the machine under the propelling power of the tractor the loading machinery is rendered inoperative by disconnecting the shaft 21 from the prime mover. When the pile of material to be loaded is reached the machine is caused to approach the same rear end first so as to submerge the lower end of the elevator beneath the surface of the material and the trucks to be loaded are successively brought beneath the overhanging end of the conveyor. The loading elements are now operated by shifting the belt 23 to the fast pulley thus initiating operation of the conveyor, the motion of which is transmitted to the elevator through the connections described. In lieu of the belt drive for the horizontal conveyor, I may substitute sprocket wheels for the pulleys 22 and 24 and connect them by an endless chain. It is also understood that a plain belt may be used as a horizontal conveyor, omitting the troughing elements 37 and also the chains 30, if desired, without departing from the essential principle of the machine. I may provide a chute at the discharging end of the conveyor to direct the material to either side of the machine instead of forwardly if such an arrangement would be more convenient for loading.

Having thus described my invention, I claim:

1. The combination with a commercially available form of gasoline tractor including a forward transverse frame member and a rear axle housing, of a rigid frame structure including spaced vertical strut members, one adapted to be supported on the said transverse frame member and the other on the axle housing, elevator and conveyor elements mounted on the frame, and means operable by the prime mover of the tractor to drive said elements.

2. A loading machine for superposition upon a commercially available form of gasoline tractor comprising a frame having appendages for coupling connection to the forward underframe and rear axle housings of said tractor, material elevator and conveyor elements mounted on the frame, and means adapted to be driven by the prime mover of the tractor to operate said elements.

3. A loading machine comprising a frame having appendages for coupling connection to the forward underframe and rear axle housings of a commercially available form of gasoline tractor by superposition thereupon, a material elevator and a conveyor mounted on the frame and cooperating to raise material and convey the same to a point in elevated advance of the tractor for deposit into a truck positioned beneath the conveyor, and means adapted to be driven by the prime mover of the tractor for operating the elevator and conveyor.

4. A loading machine comprising a frame having means for coupling connection to a forward transverse underframe member and the rear axle housings of a commercially available form of gasoline tractor by superposition thereupon, a substantially horizontal conveyor mounted on the frame and having its delivery end positioned so as to extend beyond the front end of the tractor, an inclined elevator mounted on the frame so as to extend beyond the rear end of the tractor to elevate and deposit material upon the conveyor, and means adapted to be driven by the prime mover of the tractor to operate the elevator and conveyor.

5. A loading machine comprising a frame adapted to be superposed upon the forward chassis frame and the rear axle housings of a commercially available form of gasoline tractor, a substantially horizontal conveyor mounted on the frame and having its delivery end positioned to extend beyond the front end of the tractor and its receiving end above the tractor, an inclined elevator carried by the frame having its gathering end positioned so as to be located to the rear of the tractor and its delivery end discharging into the conveyor, operating means coordinating movement of the elevator and conveyor, and means adapted to be driven by the prime mover of the tractor to operate the conveyor.

6. A loading machine comprising a frame for superposition upon the forward transverse chassis member and the rear axle housings of a commercially available form of gasoline tractor, a conveyor mounted on the frame, an elevator for raising material to the conveyor, means movably supporting the elevator to permit its lower end to be raised from the ground during transit of the machine, and means for supporting the elevator in any of its adjusted positions.

7. The combination with a tractor chassis and the rear axle housings therefor of a loading machine comprising front and rear opposed uprights, said rear axle housings affording support for the rear uprights, inclined beams mounted on the upper ends of the forward and secured to the rear uprights, an elevator having its upper end pivotally supported between the rear uprights, means for adjusting the height of said elevator's lower end relative to the ground, a conveyor operatively supported by the aforesaid inclined beams, and means driven by the tractor prime mover for operating the conveyor and coordinating movement of the elevator therewith.

8. The combination with a tractor chassis and the rear axle housings therefor of a loading machine comprising front and rear diagonally braced channel section verticals, said rear axle housings affording support for the rear verticals, said front verticals being relatively shorter than the rear verticals, inclined beams rigidly mounted on the upper ends of the forward and secured to the rear verticals, an elevator swingingly supported between the rear verticals, means for adjusting the level of the elevator foot relative to the ground, a conveyor associated with the aforesaid inclined beams, inclosing means intervening the upper end of the elevator and conveyor to prevent flying dust, and means driven by the tractor prime mover for operating the conveyor and coordinating therewith movement of the elevator.

In testimony whereof, I have hereunto signed my name at Philadelphia, Pennsylvania, this 16th day of May, 1922.

CHARLES G. PFEIFFER.

Witnesses:
JAMES H. BELL,
E. L. FULLERTON.